United States Patent
Lee et al.

(10) Patent No.: US 12,458,385 B2
(45) Date of Patent: Nov. 4, 2025

(54) ENDOSCOPE APPARATUS

(71) Applicant: ROEN Surgical, Inc., Daejeon (KR)

(72) Inventors: Dong Ho Lee, Daejeon (KR); John Kwon, Daejeon (KR); Un Je Yang, Daejeon (KR); Joon Hwan Kim, Daejeon (KR); Woo Chul Jeong, Daejeon (KR); Dong Soo Kwon, Daejeon (KR)

(73) Assignee: ROEN SURGICAL, INC., Daejeon (KR)

( * ) Notice: Subject to any disclaimer, the term of this patent is extended or adjusted under 35 U.S.C. 154(b) by 439 days.

(21) Appl. No.: 17/991,296

(22) Filed: Nov. 21, 2022

(65) Prior Publication Data

US 2024/0081850 A1    Mar. 14, 2024

(30) Foreign Application Priority Data

Sep. 13, 2022 (KR) .................. 10-2022-0115232

(51) Int. Cl.
*A61B 1/00* (2006.01)
*A61B 17/29* (2006.01)
*A61B 90/53* (2016.01)
*A61B 17/00* (2006.01)

(52) U.S. Cl.
CPC .......... *A61B 17/2909* (2013.01); *A61B 90/53* (2016.02); *A61B 1/00137* (2013.01); *A61B 2017/00818* (2013.01); *A61B 2017/2918* (2013.01); *A61B 2017/2919* (2013.01)

(58) Field of Classification Search
CPC ............ A61B 1/00137; A61B 1/00098; A61B 1/00087; A61B 1/00089; A61B 1/00085; A61B 1/018; A61B 17/2909; A61B 2017/2918; A61B 2017/2919; A61B 90/53
See application file for complete search history.

(56) References Cited

U.S. PATENT DOCUMENTS

| | | | | |
|---|---|---|---|---|
| 5,817,013 | A * | 10/1998 | Ginn .................... | A61B 1/0014 600/101 |
| 8,157,798 | B2 * | 4/2012 | Takahashi .............. | A61B 18/14 600/102 |
| 2004/0249367 | A1 * | 12/2004 | Saadat ................. | A61B 1/2736 600/101 |

(Continued)

FOREIGN PATENT DOCUMENTS

| | | |
|---|---|---|
| JP | 2005131211 A | 5/2005 |
| JP | 2007325794 A | 12/2007 |

(Continued)

*Primary Examiner* — Timothy J Neal
(74) *Attorney, Agent, or Firm* — WOMBLE BOND DICKINSON (US) LLP

(57) ABSTRACT

Disclosed is an endoscope apparatus. The endoscope apparatus of the present invention includes: an endoscope including a flexible insertion section to be inserted into a human body; a flexible channel attached to the insertion section so that a part forms a passage in a longitudinal direction of the insertion section; and an assistant arm movably inserted into the passage and manipulated by a control device, and the assistant arm includes forceps capable of gripping a human body tissue, and a bending section bent by the control device to pull the human body tissue griped by the forceps.

16 Claims, 13 Drawing Sheets

(56) References Cited

U.S. PATENT DOCUMENTS

| | | | |
|---|---|---|---|
| 2005/0267335 A1* | 12/2005 | Okada | A61B 1/00183 600/173 |
| 2008/0103357 A1* | 5/2008 | Zeiner | A61B 1/00087 600/129 |
| 2008/0177135 A1* | 7/2008 | Muyari | A61B 1/00087 600/104 |
| 2008/0249354 A1 | 10/2008 | Muyari et al. | |
| 2010/0016659 A1* | 1/2010 | Weitzner | A61B 1/0014 600/113 |
| 2012/0078053 A1 | 3/2012 | Phee et al. | |
| 2015/0257633 A1* | 9/2015 | Hassidov | A61B 1/00128 600/127 |
| 2016/0029875 A1* | 2/2016 | Okada | A61B 1/00101 600/107 |
| 2017/0049302 A1 | 2/2017 | Isoda | |
| 2017/0056038 A1* | 3/2017 | Hess | A61B 17/295 |
| 2021/0290045 A1* | 9/2021 | Takeuchi | A61B 1/00137 |
| 2021/0338046 A1* | 11/2021 | Yahagi | A61B 17/00234 |
| 2022/0240763 A1* | 8/2022 | Hidaka | A61B 1/00087 |
| 2023/0136733 A1* | 5/2023 | Cahill | A61B 17/1285 600/106 |
| 2023/0389784 A1* | 12/2023 | Shikhman, et al. | A61B 1/00128 |

FOREIGN PATENT DOCUMENTS

| | | |
|---|---|---|
| KR | 1020060092839 A | 8/2006 |
| WO | 2022081388 A1 | 4/2022 |

\* cited by examiner

ENDOSCOPE APPARATUS

CROSS-REFERENCE TO RELATED APPLICATION

This application claims priority to and the benefit of Korean Patent Application No. 10-2022-0115232, filed in the Korean Intellectual Property Office Sep. 13, 2022. The disclosure of the aforementioned application is hereby incorporated by reference in its entirety.

TECHNICAL FIELD

The present invention relates to an endoscope apparatus, and more particularly, to an endoscope apparatus configure to cut a lesion tissue while directly viewing an internal organ or an inside of a body cavity.

BACKGROUND

Upon early detection of digestive cancer, the importance of endoscopic resection that removes the affected area with an endoscope equipped with a surgical knife. Endoscopic resection includes endoscopic mucosal resection and endoscopic submucosal dissection.

Early digestive cancer and gastrointestinal polyps which can be developed to cancer can be treated endoscopic resection, and five-year survival rate is high close to almost 100% upon early diagnosis and treatment. Endoscopic resection has the advantage of reducing the recovery period by reducing the skin of the patient's body rather than an existing surgical method that cuts the skin and approaches the affected area.

However, since the endoscope is not a diagnostic medical device, it is not a surgical tool, so it has a disadvantage of long time and difficulty due to function limitations. In other words, existing commercial endoscopic surgery has difficulty in tissue traction and view field securing. Therefore, it is important for the endoscope to secure the view field of cutting section through the traction of the resected tissue upon resection.

However, the movement of the surgical tools of commercial endoscope is limited to forward and backward movement without an independent bending operation, which is limited to the tissue traction. When it is difficult to secure the view field of the resected portion, a resection difficulty increases, and the risk of unexpected bleeding and perforation increases.

As the necessity of traction to expose the cutting section of the tissue has emerged, various methods of traction using additional accessories in commercial endoscope are being studied.

For example, there is a method of performing tissue traction using additional devices such as thread, clip, and magnet. However, it is difficult to adjust the traction direction and traction force, and it is difficult to readjust a grip position, which has a fundamental limit in terms of diversity and extension of an applicable procedure.

Meanwhile, new types of endoscopic surgical robot platforms with two remote control robot arms mounted on the terminal of the endoscope are developed, but a period required for development and certification is long and cost is increased, and the economy is thus lowered, so the barrier of commercialization is high. Therefore, a method for mounting a surgical assistant arm is mounted on the commercial endoscope to secure the vision of a resection surface and tract the tissue to be easily resected is being studied.

In this regard, Japanese Patent Unexamined Publication No. 2005-131211 (hereinafter, referred to as 'Prior Document 1') discloses an exterior channel and an endoscope using the same.

The endoscope of the prior document is used by mounting the exterior channel on an endoscope body. The exterior channel includes an exterior channel body having the substantially same length as the endoscope body, a fixation section mountable on a fore-end portion of the endoscope, and a locking section mountable on the endoscope in a longitudinal direction.

The fixation section forms two openings (hereinafter, referred to as 'first and second openings') to form a roughly '8' form. The fore-end portion of the exterior channel body is inserted into the first opening. The fixation section is fixed to the exterior channel body by an adhesive force and a frictional force. The fore-end portion of the endoscope body is inserted into the second opening. The fixation section is provided as an elastic body such as rubber, etc. The fixation section is coupled to the fore-end portion of the endoscope body by the adhesive force (tape bond, etc.) and the frictional force (mechanical/elastic locking, etc.).

A camera photographing an image, and a lighting are provided at the fore-end portion of the endoscope. An internist (operating surgeon) that conducts endoscopic surgery inserts the endoscope into the internal cavity through a natural opening such as a mouse, anus, etc., and moves the endoscope to a target lesion while viewing a screen through which a camera image is output. The operating surgeon inserts a high-frequency surgical tool into a channel of the endoscope body, and inserts an assistant robot arm into an exterior channel body. The operating surgeon resects the lesion while lifting the lesion resected by the high-frequency surgical tool with the assistant robot arm.

However, the endoscope of the prior document has a problem in that the assistant robot arm inserted into the exterior channel can just move forward and backward in the longitudinal direction of the exterior channel, so the movement is limited. Therefore, it is impossible for the endoscope of the prior document to hold the tissue and tract the held tissue in a desired direction, and this acts as a decisive cause that limits an endoscopic procedure, in particular, increases a difficulty of endoscopic resection.

Further, the endoscope of the prior document has a problem in that since the endoscope itself should move in order to hold and tract the tissue with the assistant robot arm, it is difficult to secure the vision of the camera image.

Further, the endoscope of the prior document has a problem in that since the fore-end of the exterior channel body protrudes further than the fixation section, the fore-end of the exterior channel body easily damages an internal cavity wall while moving the endoscope to the target lesion.

The endoscopic surgeon of the prior document should be performed through the operating surgeon and the assistant doctor. The operating surgeon removes the target lesion by manipulating forward and backward movement and bending of a flexible endoscope. That is, the operating surgeon manipulates the flexible endoscope with any one hand, and manipulates an insertion section of the flexible endoscope with the other one hand. In addition, the assistant doctor performs on/off of the high-frequency surgical tool and manipulation of the assistant robot arm according to the instruction of the operating surgeon. That is, the assistant doctor manipulates a high-frequency surgical tool operating device with any one hand, and manipulates the assistant robot arm control device with the other one hand.

In general, the assistant robot arm device is constituted by the assistant robot arm, the flexible tube, and the control device. The flexible tube forms a long tube form. The control device is connected to any one of the flexible tube, and the assistant robot arm is connected to the other one of the flexible tube. A plurality of tendons is provided inside the flexible tube. The tendons connect the assistant robot arm and the control device. When the control device is manipulated, tension of the tendons is changed, so the assistant robot arm operates.

The flexible tube is easily transformed by an external force. However, when the form of the flexible tube is transformed, the tension of the tendon is changed, so the form of the flexible tube should be constantly maintained as possible in the endoscopic surgery process. However, there is a problem in that since the assistant doctor manipulates the high-frequency surgical tool operating device with any one hand and manipulates the assistant robot arm control device with the other one hand, it is difficult to constantly maintain the form of the flexible tube in the endoscopic surgery process.

SUMMARY OF THE DISCLOSURE

An object of the present invention is to provide an endoscope apparatus configured to adjust a traction direction and a grip position of an assistant arm.

Further, an object is to provide an endoscope apparatus configured to prevent damage occurrence of a body cavity wall in a process in which the endoscope apparatus moves to a target lesion of a body cavity.

Moreover, an object is to provide an endoscope apparatus configured to prevent form transformation of a flexible tube even though a physical assistant manipulates different devices with both hands.

The object is achieved by an endoscope apparatus which includes: an endoscope including a flexible insertion section to be inserted into a human body; a flexible channel attached to the insertion section so that a part forms a passage in a longitudinal direction of the insertion section; and an assistant arm movably inserted into the passage and manipulated by a control device, and the assistant arm includes forceps capable of gripping a human body tissue, and a bending section bent by the control device to pull the human body tissue griped by the forceps.

The bending section may form a flexible joint structure.

The bending section may include a plurality of links, and a plurality of tendons coupled to the forceps and penetrating the links in order.

The assistant arm may be rotatably inserted into the passage so as to enable driving of the assistant arm at multiple degrees of freedom.

The endoscope apparatus may include a cap coupling a fore-end portion of the flexible channel to the fore-end portion of the insertion section.

In the cap, a first insertion hole into which the fore-end portion of the insertion section is inserted, and a second insertion hole into which the fore-end portion of the flexible channel is inserted may be formed.

A bearing or a bush may be interposed between an outer surface of the fore-end portion of the flexible channel and an inner surface of the second insertion hole.

A front surface of the cap may be inclined backward toward the second insertion hole based on a center of the first insertion hole.

The assistant arm may include a flexible tube connecting the bending section and the control device, and may be configured to include a body attachment type fixation device which enables a plurality of surgical tools to be operated with both hands, and maintains a linear form of the flexible channel at a portion where the flexible tube is inserted into the passage or a fixation device or a holder attached to a patient's bend or a tray or attached to an endoscopic tool.

The holder may include a base forming a linear type mounting groove into which the flexible channel is inserted, and a body formed above the base and gripped by a user so as to adjust a position and a direction of the mounting groove.

The bearing or the bush may be interposed between the outer surface of the flexible channel and the inner surface of the mounting groove.

The body may form a symmetric form based on a reference surface to be gripped with any one of both hands, and the mounting groove may include a first mounting groove having a spacing angle with the reference surface, and a second mounting groove having a symmetric form with the first mounting groove based on the reference surface.

The holder may include a base to which the flexible channel is detachably coupled in the linear form, and a body formed above the base and gripped with at least one of an index finger and a ring finger, and a palm to use a thumb, a forefinger, and a middle finger by a user.

The holder may include an extension section extending upward from the body so as to be wrapped between the thumb and the forefinger by the user.

The holder may include a locking section extending from the body, and when a grip force for the body is cancelled, the holder may be hung on an index finger or a ring finger gripping the body by the locking section.

The cap may be made of a flexible material which may be flat when contacting an in-organ mucous, and a form of the cap may be recovered to the original form by the assistant arm when the assistant arm moves forward in the passage.

The forceps may form a plyer form which is widened and puckered, and any one of the plyer form may be longer than the other one so as for the forceps to hold a flat tissue.

The bending section may be coupled to the forceps, and the forceps and the bending section may not be parallel to each other at mutual coupling portions so as for the forceps to hold the flat tissue.

According to the present invention, an endoscope apparatus may be provided, which is configured to adjust a transaction direction and a grip position of the assistant arm while the endoscope stops as the bending section is bent by the control device so that the body tissue gripped by the forceps is pulled.

Further, an endoscope apparatus may be provided, which is configured to effectively perform view field securing and a traction motion of the tissue upon tissue incision by enabling driving of the assistant arm at multiple degrees of freedom as the assistant arm forms a flexile joint structure to implement a free motion forward and backward, upward and downward, and to the left and the right.

Further, an endoscope apparatus may be provided which is configured to prevent a wound of the internal cavity in the process of inserting the endoscope into the target lesion as a front end surface of the cap is inclined backward toward the second insertion hole around the center of the first insertion hole.

Further, an endoscope apparatus may be provided which is configured to prevent the form transformation of the flexible tube while the assistant doctor grips both the endoscopic surgical tool and the control device with both hands as the holder provided at the portion where the flexible tube is inserted into the passage maintains the linear form of the flexible channel.

DETAILED DESCRIPTION

Hereinafter, embodiments of the present invention will be described in detail with reference to the accompanying drawings. However, in describing the present invention, a description of well-known functions or configurations will be omitted for clarity of the spirit of the present invention.

An endoscope apparatus of the present invention is configured to adjust a traction direction and a grip position of an assistant arm.

Further, the endoscope apparatus of the present invention is configured to prevent damage occurrence of a body cavity wall in a process in which the endoscope apparatus moves to a target lesion of a body cavity.

Further, the endoscope apparatus of the present invention is configured to facilitate forward movement and backward movement of the assistant arm even though an endoscope forms multiple flections and retroflections in a body cavity.

Moreover, the endoscope apparatus of the present invention is configured to prevent form transformation of a flexible tube even though a physical assistant manipulates different devices with both hands.

First Exemplary Embodiment

Figure 1:
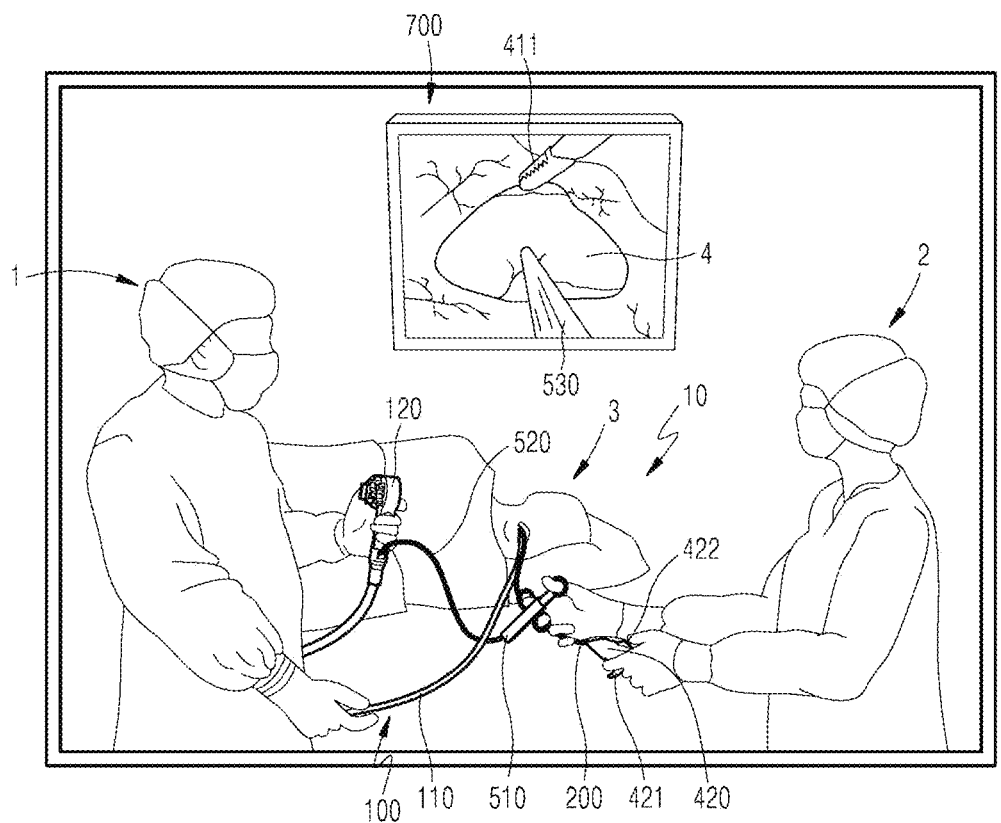
FIG. 1 is a perspective view illustrating an endoscope apparatus according to a first exemplary embodiment of the present invention.
Figure 2:
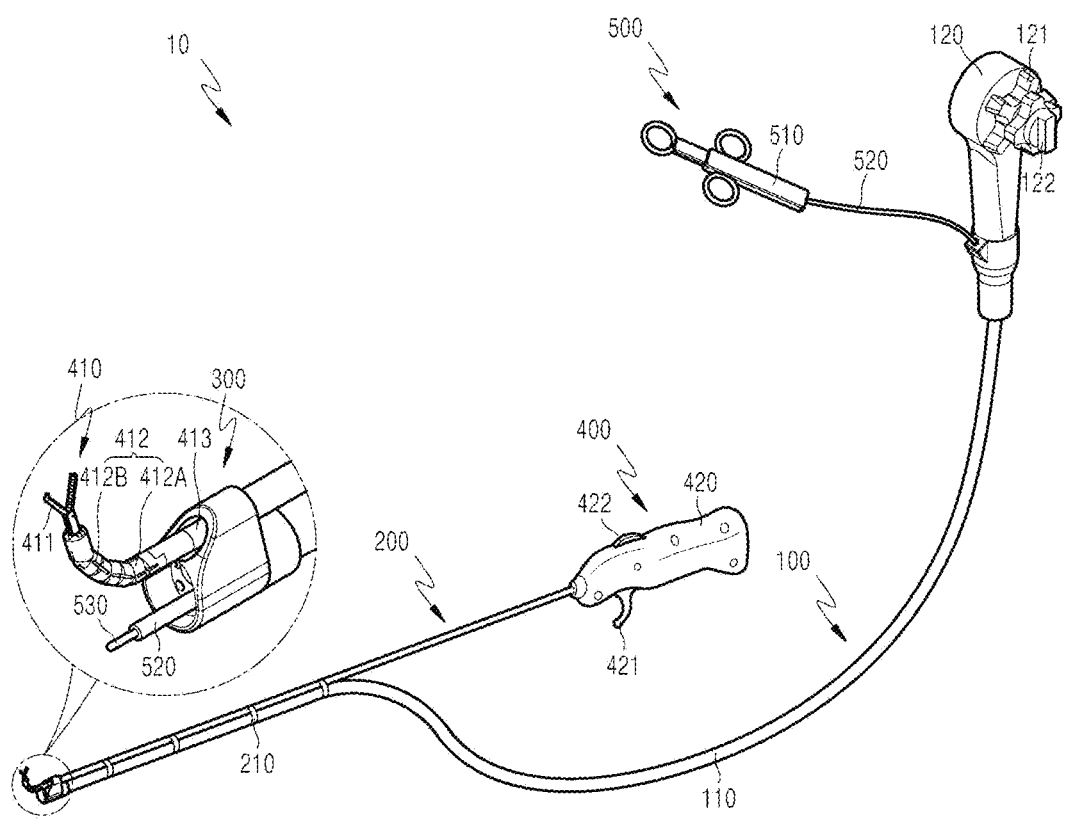
FIG. 2 is a use state diagram of the endoscope apparatus of FIG. 1.

FIG. 1 is a perspective view illustrating an endoscope apparatus 10 according to a first exemplary embodiment of the present invention. FIG. 2 is a use state diagram of the endoscope apparatus 10 of FIG. 1.

The endoscope apparatus 10 according to the first exemplary embodiment of the present invention may be widely used for endoscopic polypectomy. In particular, the endoscope apparatus 10 may be effectively used for endoscopic polypectomy for early gastrointestinal cancer (esophagus, stomach, large intestine).

As illustrated in FIGS. 1 and 2, the endoscope apparatus 10 according to the first exemplary embodiment of the present invention includes an endoscope 100, a flexible channel 200, a cap 300, an assistant arm module 400, and a surgical unit 500.

The endoscope 100 may be provided as a commercial endoscope. The endoscope 100 includes an insertion section 110 and a manipulation unit 120. As illustrated in FIG. 1, a gastroenterology doctor 1 (hereinafter, referred to as 'operating surgeon') manipulates the insertion section 110 and the manipulation unit 120 in the process of performing the endoscopic polypectomy.

The insertion section 110 is a portion which enters an internal cavity in a body through an oral cavity of a patient 3. In the process of the endoscopic polypectomy, the operating surgeon 1 holds one side of the insertion section 110 and inserts the insertion section 110 through the oral cavity of the patient 3. The operating surgeon 1 may check whether the endoscope 100 moves to an affected area 4 through a monitor 700 provided in an operating room.

A length of the insertion section 110 may be approximately 1 to 5 m. A thickness of the insertion section 110 may be approximately 9.5 mm. The insertion section 110 may be inserted into the internal cavity, and flexibly bent according to the flexion of the internal cavity.

A plurality of cables and tubes are provided inside the insertion section 110. A channel 114 forms a passage through which a catheter 520 of an electro-surgical unit 500 moves. The cable forms tension of bending a bending section of a terminal of the insertion section 110.

An objective lens 111, a light source lens 112, a nozzle 113, and the terminal of the channel 114 are provided at the terminal of the insertion section 110.

The terminal of the insertion section 110 means an opposite end portion to the manipulation unit 120. Light of a light source of the endoscope 100 is transmitted to the light source lens 112 at the terminal of the endoscope 100 through an optical fiber. Light incident in the objective lens 111 is output to a monitor 700 of the operating room through the optical fiber and an imaging device. The nozzle 113 ejects a liquid of washing the objective lens 111.

A plurality of knobs 121, a fixation device 122, etc., are provided in the manipulation unit 120. The gastroenterology doctor may bend the bending section of the terminal of the insertion section 110 by manipulating the knob 121. The gastroenterology doctor may interrupt a motion of the knob 121 by manipulating the fixation device 122.

As illustrated in FIGS. 1 and 2, the flexible channel 200 forms a long tube form. The flexible channel 200 forms a cylindrical passage 201 through which the assistant arm 410 moves. The flexible channel 200 may be made of a material which is elastically transformed, such as medical rubber, medical silicon, etc. A portion of the flexible channel 200 into which a tool is inserted may also be made of a rigid material.

A part of the flexible channel 200 is attached to the insertion section 110 so as to form a passage 201 in a longitudinal direction of the insertion section 110. One end (fore-end portion) of the flexible channel 200 is attached to a terminal portion (fore-end portion of the insertion section 110 by the cap 300. A bearing or a bush may be provided between the flexible channel 200 and the cap 300 so that the flexible channel 200 is not twisted, but spins while performing the endoscopic polypectomy.

The flexible channel 200 is attached to the insertion section 110 by a 'predetermined length' in a longitudinal direction of the insertion section 110 from the terminal of the insertion section 110. The 'predetermined length' means a length longer than a length of which the insertion section 110 is inserted into the internal cavity.

The flexible channel 200 is attached to the insertion section 110 by a plurality of mounting members 210 within the 'predetermined length'. The mounting member 210 may be an adhesive tape. When the insertion section 110 is bent by the flection of the internal cavity while being inserted into the internal cavity, the flexible channel 200 is bent by the mounting member 210 jointly with the insertion section 110.

The flexible channel 200 may be movably attached to the insertion section 110 by the mounting member 210. The adhesive tape may form an adhesive force with the flexible channel, and not form the adhesive force with the insertion section 110. The adhesive tape may form an adhesive force with the flexible channel, and not form the adhesive force with the insertion section 110.

Therefore, while the insertion section 110 forms the flection by the flection of the internal cavity, the flexible channel 200 may slightly move to a position where resistance to the bending of the insertion section 110 is minimized.

Therefore, even though the insertion section 110 is bent by the flection of the internal cavity, the resistance of the flexible channel 200 to the bending of the insertion section 110 is minimized. Further, even though a bending section of the terminal of the insertion section 110 is bent to be retroflectioned, the resistance of the flexible channel 200 to the bending of the bending section decreases.

Figure 3:
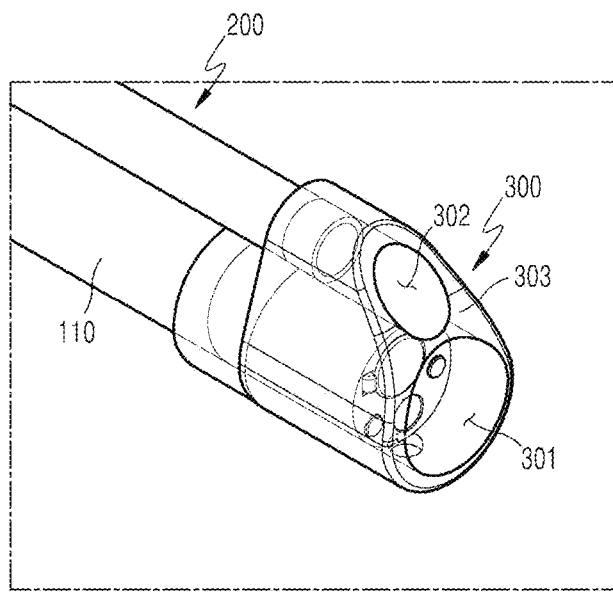
FIG. 3 is a partial enlarged diagram illustrating the insertion section, the flexible channel, and the cap of the endoscope apparatus 10 of FIG. 1.

FIG. 3 is a partial enlarged diagram illustrating the insertion section 110, the flexible channel 200, and the cap 300 of the endoscope apparatus 10 of FIG. 1.

Figure 4A:
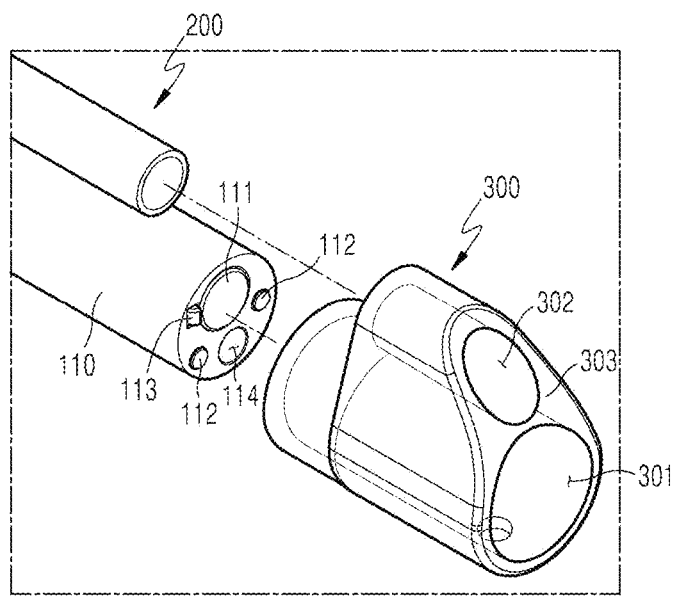
FIG. 4a is an exploded perspective view of the insertion section, the flexible channel, and the cap of FIG. 3.
Figure 5:
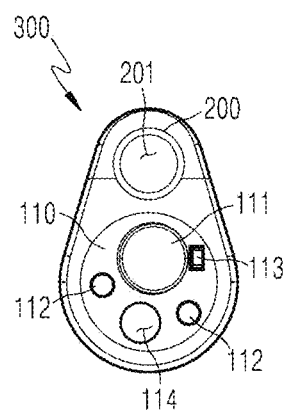
FIG. 5 is a plan view of the insertion section, the flexible channel, and the cap of FIG. 3.
Figure 6:
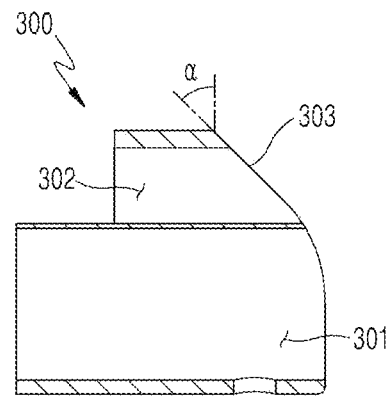
FIG. 6 is a side view of the cap of FIG. 3.

FIG. 4a is an exploded perspective view of the insertion section 110, the flexible channel 200, and the cap 300 of FIG. 3. FIG. 5 is a plan view of the insertion section 110, the flexible channel 200, and the cap 300 of FIG. 3. FIG. 6 is a side view of the cap 300 of FIG. 3.

As illustrated in FIGS. 3 and 4a, the cap 300 couples the fore-end portion of the flexible channel 200 into the fore-end portion of the insertion section 110. A first insertion hole 301 and a second insertion hole 302 are formed in the cap 300.

The fore-end portion of the insertion section 110 is inserted into the first insertion hole 301. A diameter of the first insertion hole 301 is smaller than the diameter of the fore-end portion of the insertion section 110. The cap 300 may be made of the material which is elastically transformed, such as the medical rubber, the medical silicon, etc.

Therefore, an inner surface of the insertion section 110 is in close contact with an outer surface of the fore-end portion of the insertion hole 110. The cap 300 may be fixed to the outer surface of the fore-end portion of the insertion section 110 by a self elastic recovery force. In order to strengthen a coupling force of the cap 300 and the insertion section 110, the adhesive tape may be taped along a boundary of the cap 300, and the insertion section 110 and the flexible channel 200.

The fore-end portion of the flexible channel 200 is inserted into the second insertion hole 302. The diameter of the second insertion hole 302 is smaller than the diameter of the fore-end portion of the flexible channel 200. The cap 300 may be made of the material which is elastically transformed, such as the medical silicon, etc.

Therefore, the inner surface of the second insertion hole 302 is in close contact with the outer surface of the fore-end portion of the flexible channel 200. The cap 300 may be fixed to the outer surface of the fore-end portion of the insertion section 110 by the self elastic recovery force. In order to strengthen the coupling force of the cap 300 and the flexible channel 200, the adhesive tape may be taped along the boundary of the cap 300, and the insertion section 110 and the flexible channel 200.

Figure 4B:
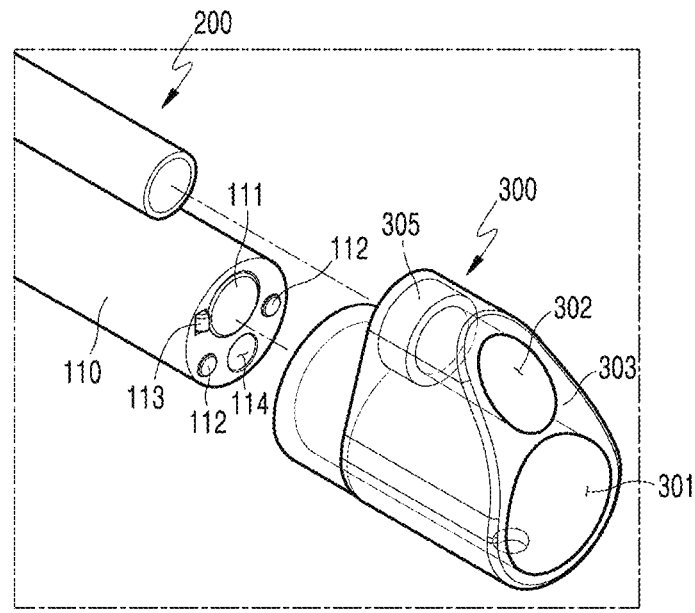
FIG. 4b is a partial exploded perspective view illustrating the insertion unit, the flexible channel, the bearing, and the cap of the endoscope apparatus of FIG. 1.

FIG. 4b is a partial exploded perspective view illustrating the insertion section 110, the flexible channel 200, the bearing 305, and the cap 300 of the endoscope apparatus of FIG. 1.

As illustrated in FIG. 4b, the bearing 305 (or bush) may be interposed between the flexible channel 200 and the cap 300. The bearing 305 may be coupled to a rear end portion of the second insertion hole 302. The outer surface of the fore-end portion of the flexible channel 200 may be coupled to the inner surface of the bearing 305. Therefore, the fore-end of the flexible channel 200 may freely rotate inside the second insertion hole 302 while performing the endoscopic polypectomy. Therefore, the flexible channel 200 may not be twisted, but spin based on the cap 300 while performing the endoscopic polypectomy.

The cap 300 is manufactured by a transparent material so as to prevent the light incident in the objective lens 111 from being blocked. A front surface 303 of the cap 300 protrudes in front of the fore-end portion of the insertion section 110. Therefore, when a dyeing liquid is injected into an affected area 4 before incision through a needle, the front surface 303 of the cap 300 may press the affected area 4 along a circumference of the first insertion hole 301.

As illustrated in FIG. 6, the front surface 303 of the cap 300 forms a form of being inclined to a rear side toward the second insertion hole 302 based on a center of the first insertion hole 301 at a predetermined angle α. Therefore, in a process in which the endoscope apparatus 10 moves to a target lesion of the internal cavity, friction generation between the front surface 303 of the cap 303 and an internal cavity wall is reduced to prevent damage occurrence of the internal cavity.

As illustrated in FIG. 2, the assistant arm module 400 includes an assistant arm 410 and a control device 420.

The control device 420 is a component that manipulates the assistant arm 410. A trigger 421 and a wheel 422 (or lever) are formed in the control device 420. An assistant doctor 2 manipulates the control device 420 according to an instruction of the operating surgeon 1.

The assistant arm 410 is movably inserted into the passage 201, and includes forceps 411, a bending section 412, and a flexible tube 413.

The forceps 411 is a component that grips a body tissue. The forceps 411 form a plyer form which is widened and puckered. The trigger 421 and the forceps 411 are connected by one or more wires (not illustrated). When the assistant doctor 2 manipulates the trigger 421, the forceps 411 are widened and puckered while the wire is pulled.

As disclosed in Korean Patent Unexamined Application No. 2017-0078616, since operating structures of the wire and the forceps 411 are known technology, a detailed description thereof will be omitted.

The assistant arm 410 may also be constituted by a suction tube, a needle, a knife, and a coagulation grasper in addition to the forceps.

The bending section 412 is coupled to the forceps 411. The bending section 412 forms a flexible joint structure. The bending section 412 includes a plurality of links 412A and a plurality of tendons 412B.

Links 421A are arranged from the forceps 411 in order. Both ends of the tendons 412B are connected to the forceps 411 and the wheel 422. The tendons 412B penetrate the links 412A in order. When the wheel 422 of the control device 420 is rotated, the tendons 412B are selectively pulled or released, and the bending section 412 is bent.

As disclosed in Korean Patent Registration No. 2349030, since the operating structures of the tendon 412B and the bending section 412 are known technology, the detailed description thereof will be omitted.

The assistant arm 410 is rotatably inserted into the passage 201. Therefore, when the assistant doctor 2 rotates the control device 420 by turning a wrist, the assistant arm 410 rotates around the longitudinal direction of the passage 201. Therefore, when the assistant doctor 2 changes a rotational angle of the control device 420, it is possible to drive the assistant arm 410 at multiple degrees of freedom.

The flexible tube 413 connects the bending section 412 and the control device 420. The flexible tube 413 forms a passage receiving the wire and the tendon 412B between the bending section 412 and the control device 420.

The flexible tube 413 may be made of the material which is elastically transformed, such as the medical rubber, the medical silicon, etc. When the insertion section 110 is bent by the flection of the internal cavity while being inserted into the internal cavity, the flexible tube 413 is bent in the flexible channel 200 jointly with the flexible channel 200.

As illustrated in FIG. 2, the surgical unit 500 includes a handle 510, a catheter 520, and a wire 530. Although not illustrated, an electro-surgical unit supplying current to the wire 530 is further provided.

The catheter 520 forms a long form in one direction. The catheter 520 has a hollow channel therein. The catheter 520 is manufactured by the flexible material. The wire 530 is inserted into the hollow channel.

The handle 510 is a component that manipulates the wire 530. The assistant doctor 2 manipulates the handle 510 according to the instruction of the operating surgeon 1 to control the wire 530 to be inserted or withdrawn in the longitudinal direction of the catheter 520.

As disclosed in Korean Patent Unexamined Application No. 2022-0028878, since the surgical unit 500 is known technology, the detailed description thereof will be omitted.

Figure 7:
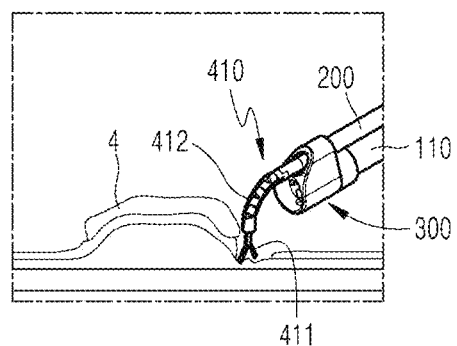
FIGS. 7 and 8 are diagrams illustrating the affected area removed by the endoscopic polypectomy using the endoscope apparatus of FIG. 1.
Figure 8:
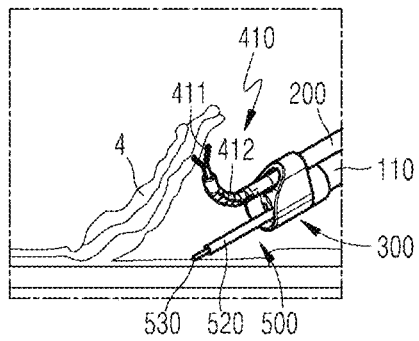

FIGS. 7 and 8 are diagrams illustrating the affected area 4 removed by the endoscopic polypectomy using the endoscope apparatus 10 of FIG. 1.

When the operating surgeon 1 moves the insertion section 110 to the affected area 4 while viewing the monitor 700, the assistant doctor 2 injects the dyeing liquid into the affected by 4 by inserting the needle into the channel 114 of the endoscope 100.

Then, the assistant doctor 2 inserts the catheter 520 of the surgical unit 500 into the channel 114 of the endoscope 100. Further, the assistant doctor 2 inserts the assistant arm 410 into the passage 201 of the flexible channel 200 to protrude the forceps 411 and the bending section 412 toward the affected area 4.

Thereafter, the operating surgeon 1 manipulates the insertion section 110, the manipulation unit 120, and the catheter 520 while observing the affected area 4 through the monitor 700 to incise the affected area 4. In this process, the assistant doctor 2 manipulates the handle 510 according to the instruction of the operating surgeon 1 to input and output the wire 530 at the end of the catheter 520.

Further, the assistant doctor 2 manipulates the control device 420 to grip the affected area 4 with the forceps 411 and bends the bending section to pull the affected area 4 so as to easily incise the affected area 4.

In this case, the assistant arm 410 moves independently from a camera of the endoscope 100 to effectively a traction motion of the tissue while securing a view field of the affected area 4. Further, the assistant arm 410 is controlled by using the control device 420 to be intuitively controlled.

A stomach ESD was performed with a living pig in order to verify the effectiveness of the endoscope apparatus according to the first exemplary embodiment of the present invention (IRB: NOTUS IACUC 20-KE-233,264). The stomach was divided into 8 parts. A commercial endoscope (GIF Q260J, Japan Olympus) was used, and a case of assistance of the assistant arm 410 and separately for each of a case of no assistance of the assistant arm 410, the ESD was performed up to the lesion located at each part of the stomach.

The ESD was performed in the order of marking, injection, precut, dissection, and sample withdrawal. The marking was performed with a diameter of 30 mm. During the dissection, the assistant arm 410 performed a task of lifting a mucosal tissue. Endoscopic surgery was performed by an experienced clinician who performed 800 or more ESDs. The assistant arm 410 was controlled by an experienced engineer.

Efficacy was evaluated by measuring a total procedure time (sec), a precut time (sec), a dissection speed (mm2/sec), the number of perforation times, etc. The dissection speed was calculated by dividing a sample area by a time required for the dissection.

It was identified that the assistant arm 410 was bent well in various endoscopic postures including a retrorefraction posture. It may be identified that the assistant arm 410 may perform tissue traction in various directions. In an experimental process, the assistant arm 450 showed a sufficient force to lift the tissue and apply the tension to the desired level. Damage to the stomach or esophagus due to attachment of the assistant arm 410 was not also discovered.

A result for the total procedure time, the precut time, the dissection speed, and the number of perforation times is shown in Table 1 below.

TABLE 1

|  | Conventional (n = 8) | Proposed (n = 8) | p-value |
|---|---|---|---|
| Total procedure time [sec] | 1370 (1145-1844) | 1256 (1124-1428) | 0.401 |
| Precut time [sec.] | 150 (141-234) | 211 (142-307) | 0.161 |
| Dissection speed [mm2/s] | 2.31 (1.64-2.55) | 3.49 (2.95-4.45) | 0.012 |
| Perforation [—] | 1 | 0 | — |

It may be identified that a procedure time in an auxiliary ESD is shortened as compared with the conventional ESD. An incision time was slightly longer than the incision time in the conventional ESD, but there was no big difference. It was identified that when the assistant arm 410 was used, the dissection speed was 1.5 times faster. It may be identified that in the case of the conventional ESD, one perforation occurred, but the perforation did not occur when using the assistant arm 410.

Second Exemplary Embodiment

Figure 9:
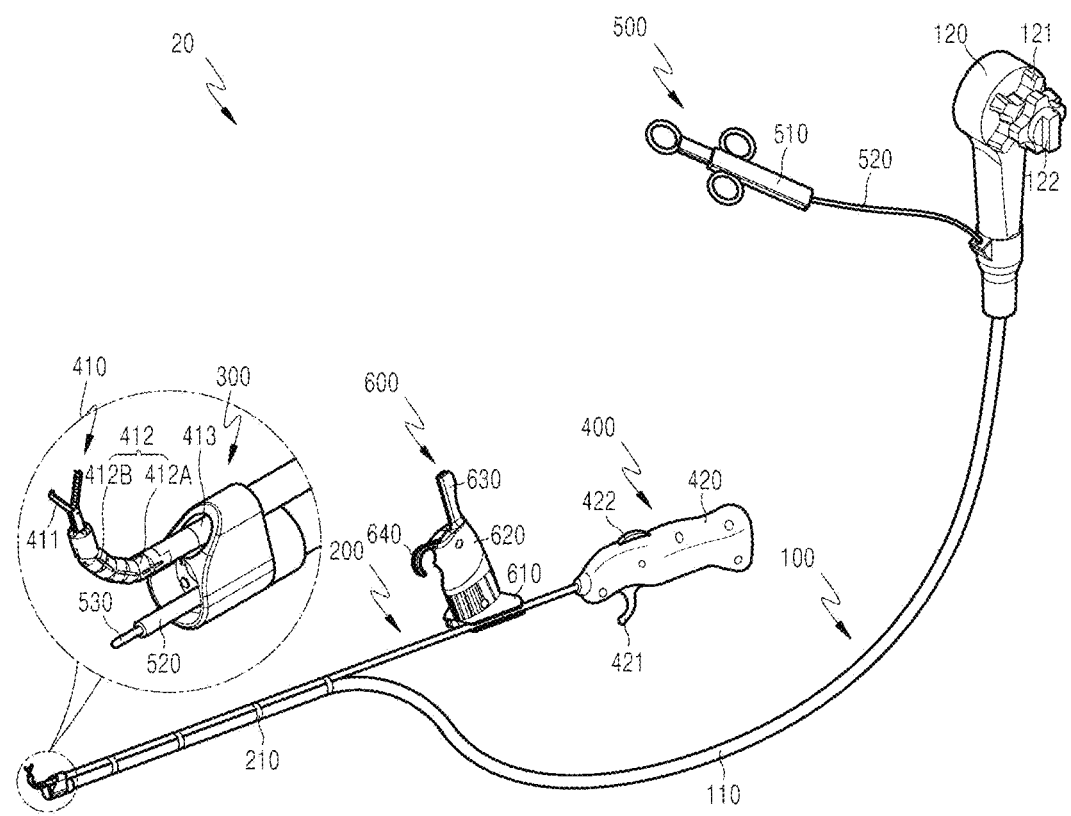
FIG. 9 is a perspective view illustrating an endoscope apparatus according to a second exemplary embodiment of the present invention.
Figure 10:
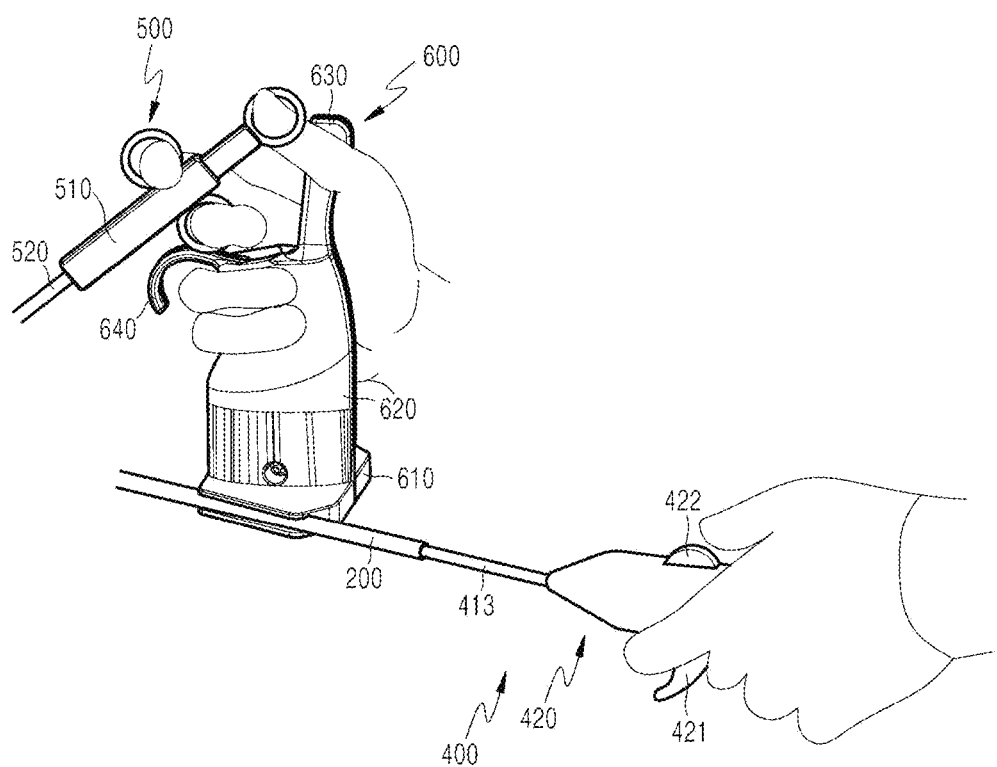
FIG. 10 is a partial perspective view illustrating a use state of the control device, a holder, the surgical unit, and the handle of FIG. 9.

FIG. 9 is a perspective view illustrating an endoscope apparatus 20 according to a second exemplary embodiment of the present invention. FIG. 10 is a partial perspective view illustrating a use state of the control device 420, a holder 600, the surgical unit 500, and the handle 510 of FIG. 9.

As illustrated in FIG. 9, the endoscope apparatus 20 according to the second exemplary embodiment of the present invention includes the endoscope 100, the flexible channel 200, the cap 300, the assistant arm module 400, the surgical unit 500, and the holder 600.

The endoscope 100, the flexible channel 200, the cap 300, the assistant arm module 400, and the surgical unit 500 of the endoscope apparatus 20 according to the second exemplary embodiment of the present invention are substantially the same as those of the first exemplary embodiment of the present invention. Therefore, hereinafter, the holder 600 will be described in detail for easy understanding of the endoscope apparatus 20 according to the second exemplary embodiment of the present invention.

As illustrated in FIGS. 9 and 10, the holder 600 is a component that enables operating a plurality of surgical tools with both hands, and maintains the linear form of the flexible channel 200 at the portion where the flexile tube 413 is inserted into the passage 201. The holder 600 includes the base 610, the body 620, an extension section 630, and a locking section 640.

Figure 11:
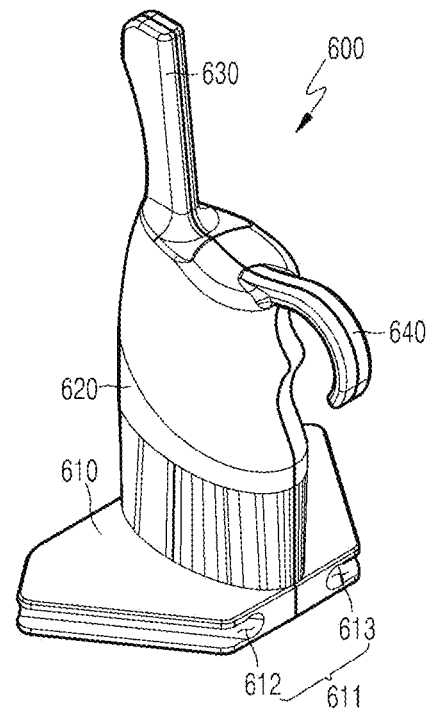
FIG. 11 is a perspective view illustrating the holder of the endoscope apparatus of FIG. 9.

FIG. 11 is a perspective view illustrating the holder 600 of the endoscope apparatus 20 of FIG. 9.

As illustrated in FIG. 11, a base 610 is a component that forms a mounting groove 611. The mounting groove 611 is configured by a linear type groove into which the flexible channel 200 is inserted. The flexible channel 200 is detached from and coupled to the mounting groove 611 in a linear form.

The base 610 is provided at the bottom of the holder 600. The bottom of the holder 600 forms a plane. Therefore, the holder 600 may be seated on the top of a surgical cart.

As illustrated in FIG. 10, a body 620 is a component which a user, i.e., the assistant doctor 2 grips with one hand. The body 620 is formed above the base 610. The body 620 has a form of extending upward from the base 610. The assistant doctor 2 grips the body 620 to adjust a position and a direction of the mounting groove 611.

The flexible tube 413 forms a passage receiving the wire and the tendon 412B between the bending unit 412 and the control device 420. Flection generation of the flexible tube 413 influences the tension of the wire and the tendon 412B. Therefore, it is important to maintain the form of the flexible tube 413 in the process of performing the endoscopic polypectomy.

As illustrated in FIGS. 9 and 10, in order to minimize tension fluctuation of the wire and the tendon 412B by the flection of the flexible tube 413 while performing the endoscopic polypectomy, the flexible tube 413 should be maintained in the linear form as possible.

Referring to FIG. 1, the assistant doctor 2 in the first exemplary embodiment of the present invention should maintain the linear form of the flexible channel 200 at a portion where the flexible tube 413 is inserted into the passage 201 by holding the flexible channel 200 with an index finger and a ring finger of a hand gripping the surgical unit handle 510.

However, since an area in which the flexible channel 200 contacts the index finger and ring finger is small, and the flexible channel 200 is easily rotated or flectioned between the index finger and the ring finger, it is not easy to maintain the linear form of the flexible channel with the index finger and the ring finger of the hand which manipulates the surgical unit handle 510.

As illustrated in FIG. 10, the assistant doctor 2 in the second exemplary embodiment of the present invention grips and the body 620 and adjusts the position and the direction of the mounting groove 611 to maintain the linear form of the flexible channel 200 at the portion where the flexile tube 413 is inserted into the passage 201.

Figure 12:
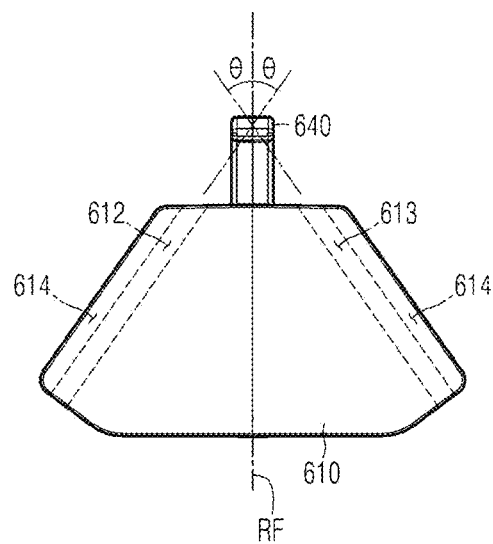
FIG. 12 is a bottom view illustrating a mounting groove of the holder of FIG. 11.

FIG. 12 is a bottom view illustrating a mounting groove 611 of the holder 600 of FIG. 11.

As illustrated in FIG. 12, the body 620 forms a symmetric form based on a reference surface (RF). Therefore, even though the assistant doctor 2 grips the body 620 with any one of both hands, the reference surface (RF) forms the substantially same spacing angle with a front surface of the assistant doctor 2.

As illustrated in FIG. 11, a groove corresponding to a grip form of the index finger and the ring finger is formed in the body 620. The assistant doctor 2 may grip the body 620 with at least one of the index finger and the ring finger, and a palm.

As illustrated in FIG. 10, the assistant doctor 2 may grip the body 620 in a state of being capable of using a thumb, the forefinger, and a middle finger. Therefore, the assistant doctor 2 may easily manipulate the surgical unit handle 510 with the thumb, the forefinger, and the middle finger of the hand gripping the body 620.

As illustrated in FIG. 12, the mounting groove 611 includes a first mounting groove 612 and a second mounting groove 613.

The first mounting groove 612 forms a spacing angle of a predetermined angle θ from the reference surface (RF). The second mounting groove 613 forms the symmetric form to the first mounting groove 612 based on the reference surface (RF). Therefore, the second mounting groove 613 also forms the spacing angle of θ from the reference surface (RF).

The spacing angle of the predetermined angle θ is derived by a biotechnology design. While the user grips the body 620 and the control device 420 comparatively conveniently with both hands, the first mounting groove 612 or the second mounting groove 613 may be positioned on the same line as a front of the control device 420. As an example, θ may be 35°.

The first mounting groove 612 and the second mounting groove 613 have a diameter equal to or less than the diameter of the flexible channel 200. The flexible channel 200 may have a coupling force to the mounting groove 611 by the self elastic force.

Figure 13A:
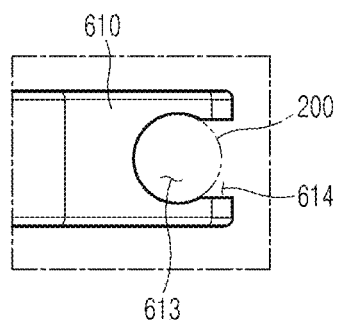
FIG. 13a is a diagram illustrating the mounting groove of the holder of FIG. 11.

FIG. 13*a* is a diagram illustrating the mounting groove 611 of the holder 600 of FIG. 11.

As illustrated in FIG. 13*a*, the flexible channel 200 is inserted into the first mounting groove 612 and the second mounting groove 613 through an entrance groove 614 narrower than the first mounting groove 612 and the second mounting groove 613. A narrow gap of the entrance groove 614 suppresses unintended deviation of the flexible channel 200.

Figure 13B:
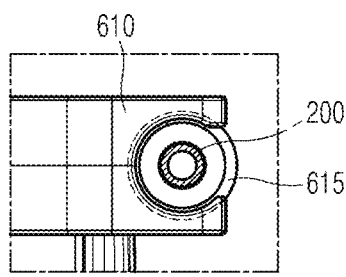
FIG. 13b is a diagram illustrating a state in which a bearing is provided in the mounting groove of FIG. 11.

FIG. 13*b* is a diagram illustrating a state in which a bearing 615 is provided in the mounting groove 611 of FIG. 11.

As illustrated in FIG. 13*b*, the bearing 615 (or bush) may be interposed between the flexible channel 200 and the inner surface of the mounting groove 611. The bearing 615 may be coupled to the inner surface of the mounting groove 611. The outer surface of the flexible channel 200 may be coupled to the inner surface of the bearing 615. Therefore, the flexible channel 200 may freely rotate inside the mounting groove 611 while performing the endoscopic polypectomy. Therefore, the flexible channel 200 may not be twisted, but spin based on the mounting groove 611 while performing the endoscopic polypectomy.

As illustrated in FIGS. 10 and 11, the extension section 630 extends upward from the body 620. The assistant doctor 2 may wrap the extension section 630 with a part between the thumb and the forefinger of the hand. Therefore, the assistant doctor 2 may suppress the movement of the body 620 in spite of gripping the body 620 only with at least one of the index finger and the ring finger, and the palm.

The locking section 640 extends from the top of the body 620. The locking section 640 has a form of wrapping the top of at least one of the index finger and the ring finger gripping the body 620.

Even though a grip force for the body 620 is cancelled, the holder 600 is hung on the index finger or the ring finger gripping the body 620 by the locking section 640. Therefore, even though the grip force for the body 620 is cancelled due to a mistake of the assistant doctor 2 or an external force, the fall of the holder 600 and the resulting medical accident may be prevented.

Third Exemplary Embodiment

Figure 14:
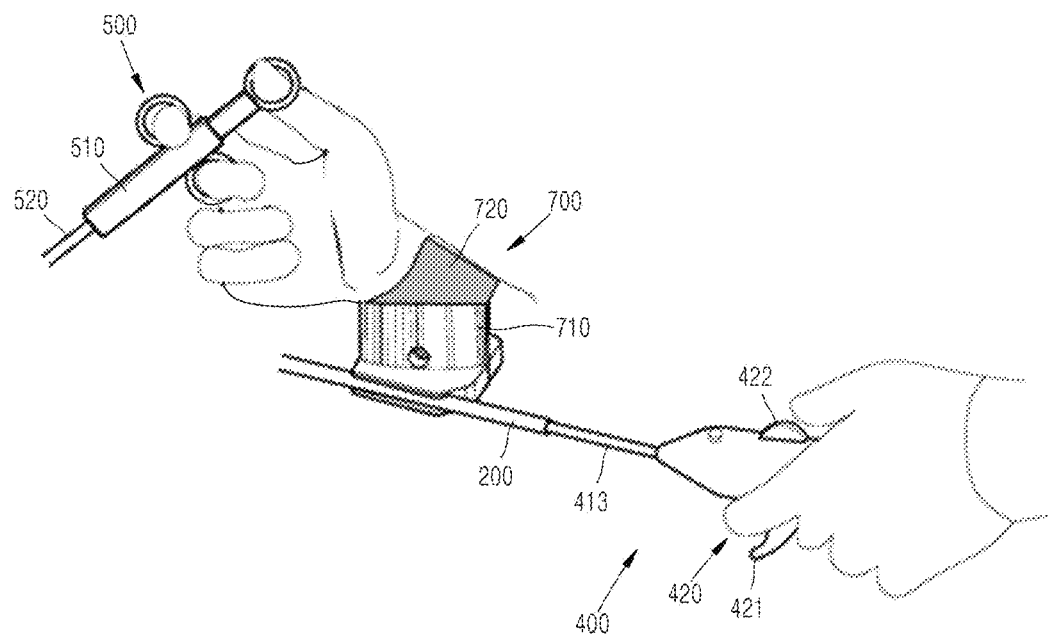
FIG. 14 is a diagram illustrating a body attachment type fixation device.
Figure 15:
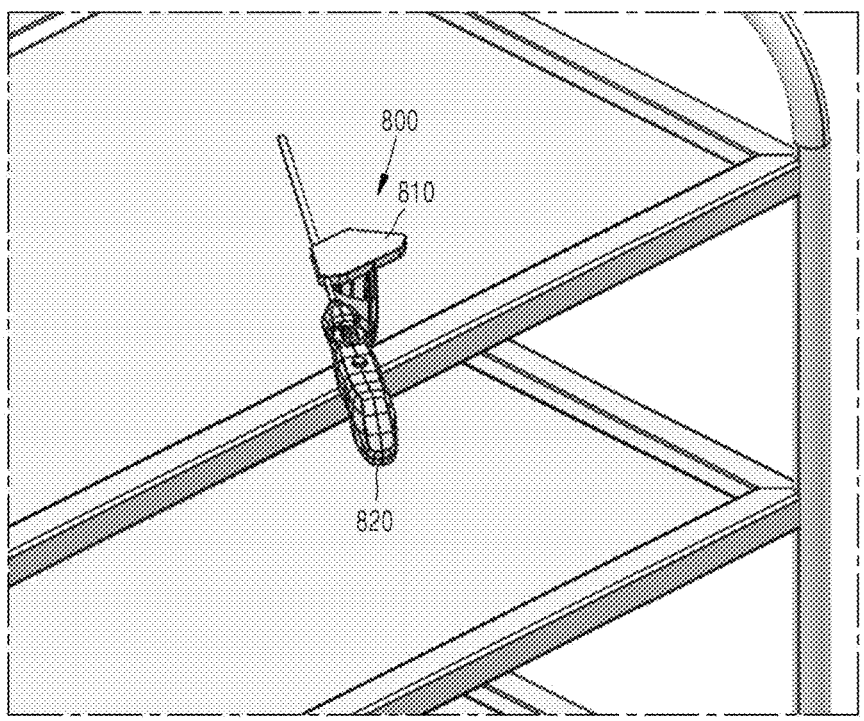
FIG. 15 is a diagram illustrating a fixation device fixed to a patient's bed or a surgical tray.
Figure 16:
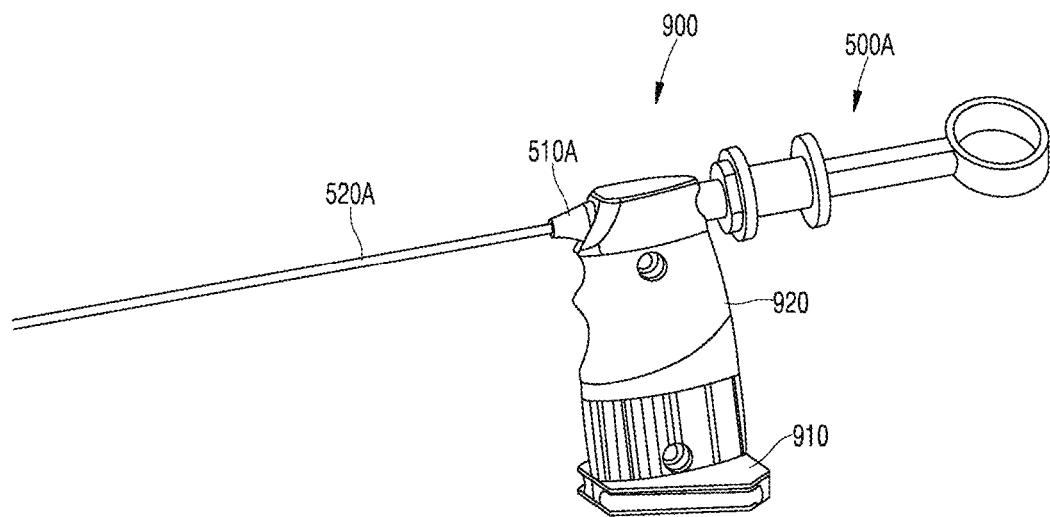
FIG. 16 is a diagram illustrating a commercial tool attachment type fixation device.

FIG. 14 is a diagram illustrating a body attachment type fixation device 700. FIG. 15 is a diagram illustrating a fixation device 800 fixed to a patient's bed or a surgical tray. FIG. 16 is a diagram illustrating a commercial tool attachment type fixation device 900.

As illustrated in FIGS. 14 to 16, the holder 600 may be replaced with the body attachment type fixation device 700, (other) fixation device 800 attached to the patient's bed, a tray, or an endoscopic tool, or the commercial tool attachment type fixation device 900.

As illustrated in FIG. 14, the body attachment type fixation device 700 may mean a deice which may be fixed to the wrist of the assistant doctor 2 or a device which may be attached to a body of the patient 3. The body attachment type fixation device 700 may include an attachment base 710 and an attachment member 720 (hereinafter, referred to as a 'first attachment member'). The attachment base 710 may have the similar or same structure as the base 610 of the second exemplary embodiment.

The first attachment member 720 is coupled to the attachment base 710. The first attachment member 720 is constituted by various members which may be attached/fixed to the wrist of the assistant doctor 2 or the body of the patient 3. Various members may mean a member detachable from the wrist or the body, such as a Velcro tape, etc.

As illustrated in FIG. 15, the other fixation device 800 may mean a movement tray type temporary holder or a device attachable to a procedure/surgical bed. The other fixation device 800 may also be attached to a handle part of the commercial tool. The other fixation device 800 may include an attachment base 810 and an attachment member 820 (hereinafter, referred to as a 'second attachment member'). The attachment base 810 may have the similar or same structure as the base 610 of the second exemplary embodiment.

The second attachment member 820 is coupled to the attachment base 810. The second attachment member 820 is constituted by movement tray type temporary holder or various members attachable to the procedure/surgical bed. Various members may mean the movement tray type temporary holder or the member detachable from the procedure/surgical bed, such as a clamp, a plyer, the Velcro tape, etc.

As illustrated in FIG. 15, the commercial tool attachment type fixation device 900 may mean a device attachable to the commercial tool to the letter. The commercial tool attachment type fixation device 900 may include an attachment base 910 and an attachment member 920 (hereinafter, referred to as a 'third attachment member'). The attachment base 910 may have the similar or same structure as the base 610 of the second exemplary embodiment.

The third attachment member 920 is coupled to the attachment base 910. The third attachment member 920 is formed above the attachment base 910. The third attachment member 920 is a component which the assistant doctor 2 grips with one hand. The third attachment member 920 may be the similar or same structure as the body 620 of the second exemplary embodiment.

The third attachment member 920 is formed in a form of extending upward from the attachment base 910. The third attachment member 920 may be attached to the commercial tool. Here, the commercial tool may mean an electro-surgical unit 500A. In this case, the third attachment member 920 may be attached to a handle 510A of the electro-surgical unit 500A. As an example, a groove into which the handle 510A is inserted may be formed on the top of the third attachment member 920. The assistant doctor 2 manipulates the handle 510A while griping the body 620 to control the wire 530 to be inserted or withdrawn in the longitudinal direction of a catheter 520A.

Figure 17:
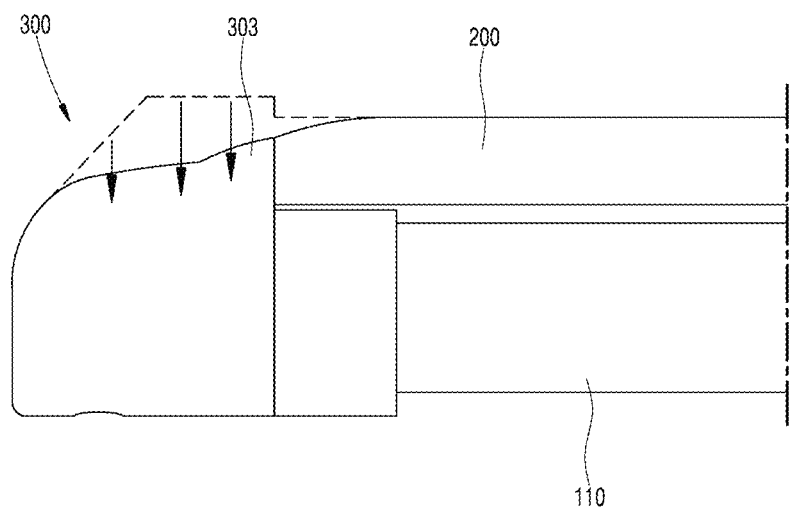
FIG. 17 is a side view illustrating a transformation state of the cap.
Figure 18:
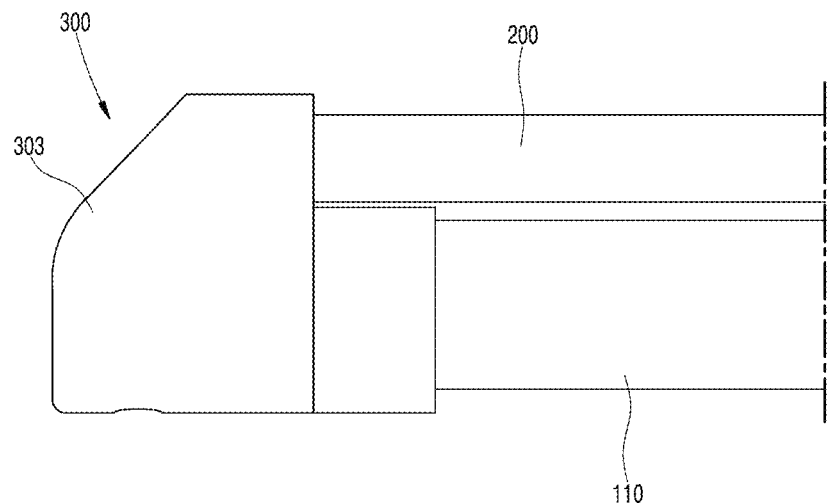
FIG. 18 is a side view illustrating a state in which the shape of the cap is recovered.
Figure 19:
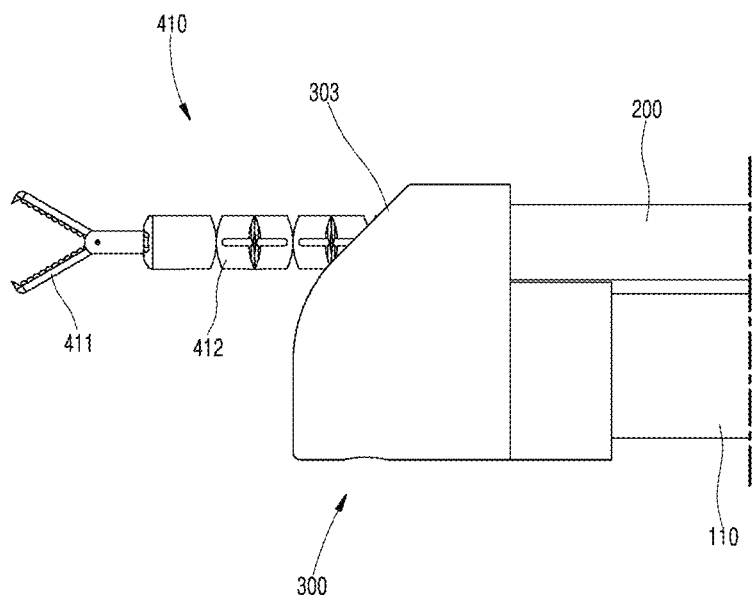
FIG. 19 is a side view illustrating a state in which the assistant arm is withdrawn to the front of the cap.

FIG. 17 is a side view illustrating a transformation state of the cap 300. FIG. 18 is a side view illustrating a state in which the shape of the cap 300 is restored. FIG. 19 is a side view illustrating a state in which the assistant arm 410 is withdrawn to the front of the cap 300.

As illustrated in FIG. 17, the cap 300 may be made of a flexible material which may be flat when contacting an in-organ mucosa. As an example, the cap 300 may be made of the material which is elastically transformed, such as the medical rubber, the medical silicon, etc. An arrow of FIG. 17 means a force with which the in-organ mucosa acts on the cap 300. The cap 300 is flat when contacting the in-organ mucosa to minimize a scratch phenomenon of the mucosa, which may occur when inserting an endoscopic tool having a larger diameter into the esophagus and the large intestine.

As illustrated in FIGS. 18 and 19, the shape of the cap 300 may be recovered to the original shape by the assistant arm 410 when the assistant arm 410 moves forward in the passage. When the assistant arm 410 moves forward, the insides of the channel 200 and the cap 300 may be applied and coated with a lubricant so that the flexible channel 200 and the cap 300 are recovered to the original state, and the assistant arm 410 smoothly moves forward.

Figure 20:
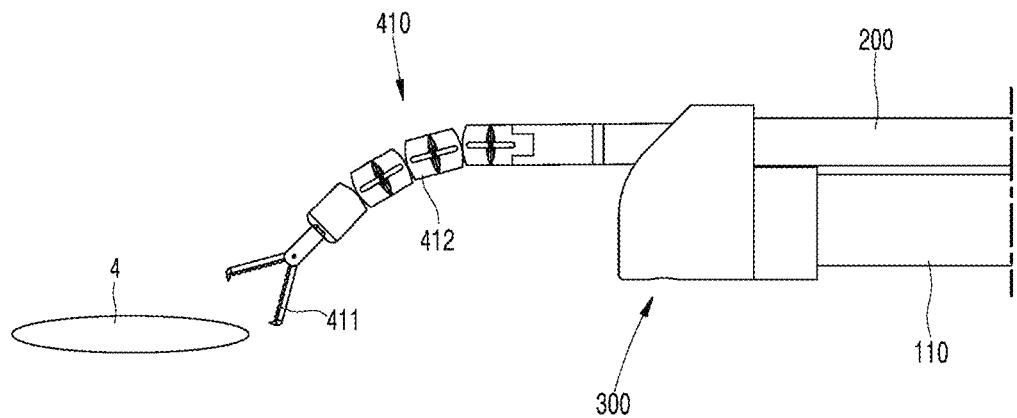
FIGS. 20 to 22 are diagrams illustrating the affected area removed by the endoscopic polypectomy using the endoscope apparatus of FIG. 1.
Figure 21:
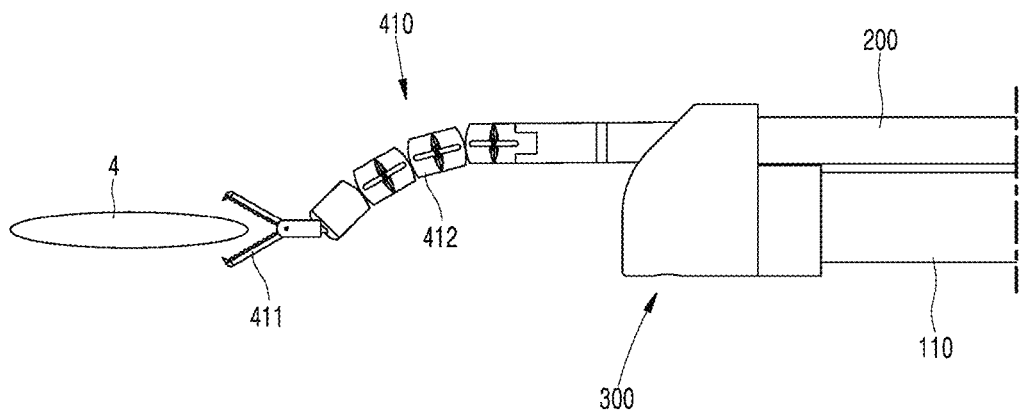
Figure 22:
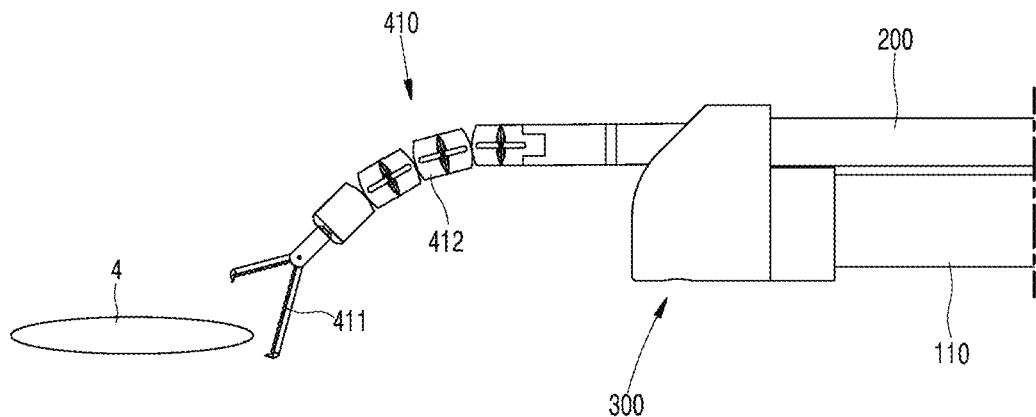

FIGS. 20 to 22 are diagrams illustrating the affected area 4 removed by the endoscopic polypectomy using the endoscope apparatus 10 of FIG. 1.

As illustrated in FIG. 20, the forceps 411 form the plyer form which is widened and puckered. However, when a mucous tissue of the affected area 4 is horizontally laid, it may be difficult for the forceps 411 to hold the mucous tissue.

As illustrated in FIG. 21, the forceps 411 and the bending section 412 may not be parallel at a portion where the forceps 411 and the bending section 412 are coupled to each other so as for the forceps 411 to easily hold the flat tissue. Therefore, while the bending section 412 is bent toward the affected area, the forceps 411 may face the mucous tissue of the affected area 4. Therefore, when the mucous tissue of the affected area 4 is horizontally laid, it may be difficult for the forceps 411 to hold the mucous tissue.

As illustrated in FIG. 22, any one side of the plyer form may be formed to be longer than the other one side so as for the forceps 411 to easily hold the flat tissue. That is, when a lower jaw of the forceps 411 is longer than an upper jaw, griping the flat tissue may be facilitated.

According to the present invention, an endoscope apparatus 10 may be provided, which is configured to adjust a transaction direction and a grip position of the assistant arm 410 while the endoscope 100 stops as the bending section 412 is bent by the control device 420 so that the body tissue gripped by the forceps 411 is pulled.

Further, an endoscope apparatus 10 may be provided, which is configured to effectively perform view field securing and a traction motion of the tissue upon tissue incision by enabling driving of the assistant arm 410 at multiple degrees of freedom as the assistant arm 410 forms a flexile joint structure to implement a free motion forward and backward, upward and downward, and to the left and the right.

Further, an endoscope apparatus 10 may be provided which is configured to prevent a wound of the internal cavity in the process of inserting the endoscope 100 into the target lesion as a front end surface of the cap 300 is inclined backward toward the second insertion hole 302 around the center of the first insertion hole 301.

Further, an endoscope apparatus 20 may be provided which is configured to prevent the form transformation of the flexible tube 413 while the assistant doctor 2 grips both the endoscopic surgical tool and the control device 420 with both hands as the holder 600 provided at the portion where the flexible tube 413 is inserted into the passage 201 maintains the linear form of the flexible channel 200.

Hereinabove, a specific exemplary embodiment of the present invention is described and illustrated, but the present invention is not limited to the exemplary embodiments described herein, and it would be apparent to those skilled in the art that various changes and modifications might be made without departing from the spirit and the scope of the present invention. Therefore, the modified examples or transformed examples should not be individually appreciated from the technical spirit or viewpoint of the present invention, and the transformed exemplary embodiments belong to the appended claims of the present invention.

DESCRIPTION OF MAIN REFERENCE NUMERALS OF DRAWINGS 10,20: Endoscope apparatus
100: Endoscope
200: Flexible channel
110: Insertion section
201: Passage
111: Objective lens
210: Mounting member
112: Light source lens
300: Cap
113: Nozzle
301: First insertion hole
114: Channel
302: Second insertion hole
120: Manipulation unit
303: Front surface
121: Knob
600: Holder
122: Fixation device
610: Base
400: Assistant robot arm module
611: Mounting groove
410: Assistant robot arm
612: First mounting groove
411: Forceps
613: Second mounting groove
412: Bending section
614: Entrance groove
412A: Link
620: Body
412B: Tendon
RF: Reference surface
413: Flexible tube
630: Extension section
420: Control device
640: Locking section
421: Trigger
700: Monitor
422: Wheel
1: Operating surgeon
500: Surgical unit
2: Assistant doctor
510: Handle
3: Patient
520: Catheter
4: Affected area
530: Wire

The invention claimed is:
1. An endoscope apparatus comprising:
an endoscope including a flexible insertion section to be inserted into a human body;
a flexible channel attached to the insertion section so that a part forms a passage in a longitudinal direction of the insertion section; and
an assistant arm movably inserted into the passage and manipulated by a control device,
wherein the assistant arm includes
forceps capable of gripping a human body tissue,
a bending section bent by the control device to pull the human body tissue gripped by the forceps, and a flexible tube connecting the bending section and the control device, wherein a holder maintaining a linear form of the flexible channel at a portion where the flexible tube is inserted into the passage, wherein the holder includes a base forming a linear type mounting groove into which the flexible channel is inserted, and a body formed above the base and gripped by a user so as to adjust a position and a direction of the mounting groove, wherein the body forms a symmetric form based on a reference surface to be gripped with any one of both hands, and the mounting groove includes a first mounting groove having a spacing angle with the reference surface, and a second mounting groove having a symmetric form with the first mounting groove based on the reference surface.

2. The endoscope apparatus of claim 1, wherein the bending section forms a flexible joint structure.

3. The endoscope apparatus of claim 2, wherein the bending section includes a plurality of links, and a plurality of tendons coupled to the forceps and penetrating the links in order.

4. The endoscope apparatus of claim 1, wherein the assistant arm is rotatably inserted into the passage so as to enable driving of the assistant arm at multiple degrees of freedom.

5. The endoscope apparatus of claim 1, further comprising:

a cap coupling a fore-end portion of the flexible channel to the fore-end portion of the insertion section.

6. The endoscope apparatus of claim 5, wherein in the cap, a first insertion hole into which the fore-end portion of the insertion section is inserted, and a second insertion hole into which the fore-end portion of the flexible channel is inserted are formed.

7. The endoscope apparatus of claim 6, wherein a bearing or a bush is interposed between an outer surface of the fore-end portion of the flexible channel and an inner surface of the second insertion hole.

8. The endoscope apparatus of claim 6, wherein a front surface of the cap is inclined backward toward the second insertion hole based on a center of the first insertion hole.

9. The endoscope apparatus of claim 5, wherein the cap is made of a flexible material which may be flat when contacting an in-organ mucous, and a form of the cap is recovered to an original form by the assistant arm when the assistant arm moves forward in the passage.

10. The endoscope apparatus of claim 1, wherein a bearing or a bush is interposed between an outer surface of the flexible channel and an inner surface of the mounting groove.

11. The endoscope apparatus of claim 1, wherein the holder includes an extension section extending upward from the body so as to be wrapped between a thumb and a forefinger by the user.

12. The endoscope apparatus of claim 1, wherein the holder includes a locking section extending from the body, and when a grip force for the body is cancelled, the holder is hung on an index finger or a ring finger gripping the body by the locking section.

13. The endoscope apparatus of claim 1, further comprising:

a body attachment type fixation device maintaining a linear form of the flexible channel at a portion where the flexible tube is inserted into the passage, wherein the body attachment type fixation device includes an attachment base to which the flexible channel is detachably coupled in the linear form, and an attachment member coupled to the attachment base, and fixable to a wrist of an assistant doctor or attachable to a patient's body.

14. The endoscope apparatus of claim 1, wherein the flexible tube includes a fixation device maintaining a linear form of the flexible channel at a portion where the flexible tube is inserted into the passage, wherein the fixation device includes an attachment base to which the flexible channel is detachably coupled in the linear form, and an attachment member coupled to the attachment base, and attachable to a movable tray or a surgical bed.

15. The endoscope apparatus of claim 1, wherein the forceps form a plyer form which is widened and puckered, and any one of the plyer form is longer than the other one so as for the forceps to hold a flat tissue.

16. The endoscope apparatus of claim 1, wherein the bending section is coupled to the forceps, and the forceps and the bending section are not parallel to each other at mutual coupling portions so as for the forceps to hold a flat tissue.

* * * * *